Aug. 28, 1956  R. DEIBEL  2,760,220
WINDSHIELD WIPER
Filed April 2, 1952
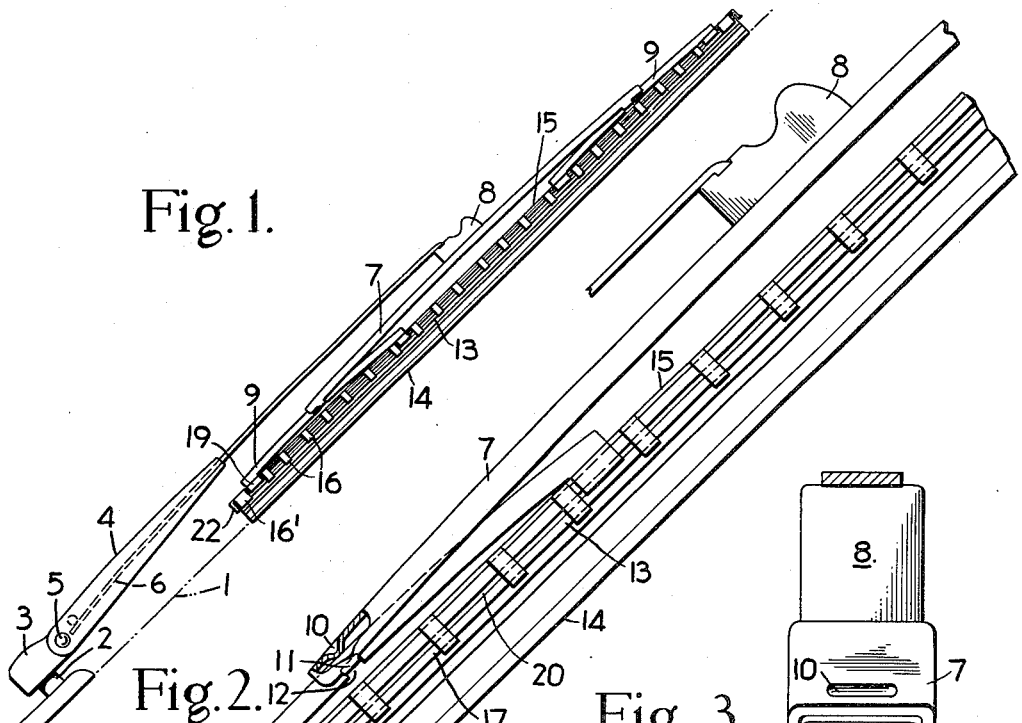
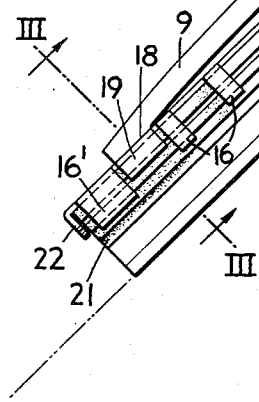
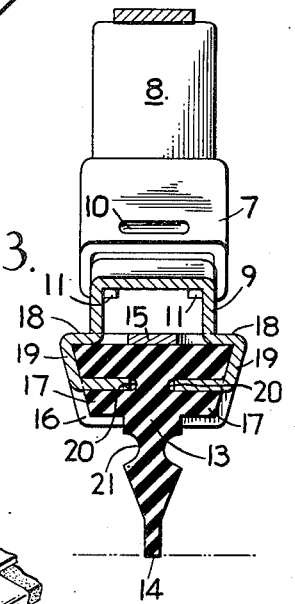
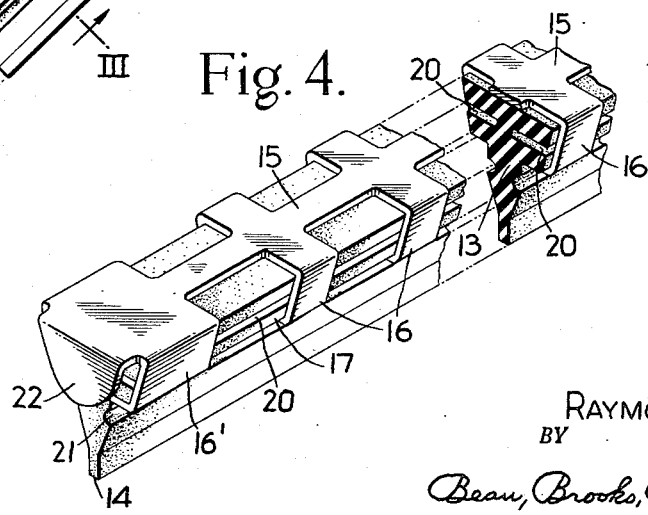
INVENTOR.
RAYMOND DEIBEL
BY
Bean, Brooks, Buckley & Bean.
ATTORNEYS United States Patent Office 2,760,220
Patented Aug. 28, 1956

2,760,220

WINDSHIELD WIPER

Raymond Deibel, Cheektowaga, N. Y., assignor to Trico Products Corporation, Buffalo, N. Y.

Application April 2, 1952, Serial No. 280,117

4 Claims. (Cl. 15—245)

This invention relates to the windshield cleaning art and especially to the wiper construction thereof, the primary object being to provide a wiper of practical design that is effective on the windshields of modern automobiles to provide and maintain a clean field of vision with a minimum of operational noise.

More particularly the purpose of this invention is to provide a wiper for curved windshields in which the wiping or blade element is provided with variations in the degree of flexibility at points spaced throughout its length with elastic and slidable connections to mount the blade element with a flexible backing of narrow construction to lessen the lifting tendency of the wiper when used in high pressure air currents. Heretofore the use of backing strips and backing channels has been resorted to in a manner which has subjected the wiper to wind-lifting forces through the exposed outer marginal edges of the backing, giving the wiper an unnecessarily large surface area exposed to the wind currents while driving at higher car speeds and into head winds.

Again, the invention resides in a wiper unit that incorporates a surface-conforming backing with a minimum surface exposure, the backing being given a resilient suspension from the pressure applying superstructure. By this means the elasticity of the rubber, or a substitute, is relied upon to furnish a rubber mounting advantage to control the rotation of the blade unit on its longitudinal axis, eliminating noise and providing for a greater flexibility for conforming the wiping blade and its backing to the contour of the glass.

The rubber blade unit is shown mounted in dual rockers. A body of any desired shape for the blade may be used to interlock these elements. In the disclosed showing the blade element is recessed on its opposite sides to receive inturned parts of the supporting rockers. The recesses extend from end to end for ease in assembling the parts. The backing is provided with fingers for straddling the rubber blade, the fingers similarly being inturned to interlock the backing and the blade element together. Flexible support for the blade element is maintained independently of the pressure distributing means, the arm pressure being applied by the rockers directly to the elastic blade and in suspension to the flexible backing. The inward thrust of a wiper carrying arm is applied through the rockers to the rubber itself at designated areas prescribed by straddling portions of the backing. This employs both flexibility and elasticity to transmit pressure, which is transmitted by using the rubber mass as both a wiper and pressure distributing linkage. The flexible backing gives the rubber lateral rigidity while permitting transverse flexibility normal to the surface, the same being anchored exclusively in rubber without any direct connection to any other element of the wiper. Smoothness of operation results from the rubber mounting of the blade unit with its superstructure. Compactness and elimination of wind-catching ledges is accomplished.

The foregoing and other objects will appear as this description progresses, reference being made herein to the accompanying drawing wherein:

Fig. 1 is a side elevation of the improved wiper, showing it mounted upon a windshield;

Fig. 2 is an enlarged fragmentary side view of the wiper more clearly illustrating its structure;

Fig. 3 is a transverse sectional view of the wiper about on line 3—3 of Fig. 2; and Fig. 4 is an enlarged fragmentary perspective view of the wiper with parts broken away for greater clarity.

Referring more particularly to the drawings, the numeral 1 designates a windshield, 2 a wiper shaft journaled at the lower side thereof, 3 the inner or mounting section of a wiper carrying arm, 4 the outer or wiper carrying section pivotally connected to the mounting section by a pivot 5 and urged by a spring 6 to press the wiper upon the windshield, all in a well-known manner.

The wiper comprises a blade or squeegee unit and a pressure-distributing superstructure, the latter being illustrated as having a bridge 7 with a fixed arm-attaching clip 8 and terminally mounted rockers 9 that are retained on fulcrum ribs 10 by straddling lugs 11 inturned into recesses 12.

The blade unit has an elastic blade or squeegee 13, with a wiping edge 14, and a flexible holder therefor in the form of a backing member 15 seating thereon and having fingers 16 which straddle and grasp the back portion of the blade in a manner to permit surface-conforming flexure of the unit. The wiping edge 14 is laterally flexible and constitutes a web extension from a relatively heavier body which latter is given surface-conforming support by the flexible backing 15, 16. The fingers extend down on the opposite sides of the body and thence inwardly beneath lateral shoulders 17 to more or less firmly bind the parts of the unit together. This arrangement unites the parts in a manner to afford the desired surface-conforming support while precluding the lateral distension of the unit. To this end, the backing member 15 is lineally distensible but may be transversely flexible throughout if desired. When given a broader dimension than thickness, the backing member 15 will tend to augment the lateral stability of the blade unit as otherwise provided by its lineally distensible characteristic.

The mounting of the blade unit on its pressure-distributing superstructure is a resilient one which enables the blade unit to rock upon its wiping edge at the beginning of each stroke for assuming the required dragging inclination so much desired for efficient wiping. This resilient mounting is accomplished herein by connecting the rockers 9 directly to the blade element, and for this purpose the opposite ends of the rockers are provided with presser feet 18 that directly rest upon the back of the blade element for transmitting the spring urge of the wiper carrying arm thereto. These presser feet have claw extensions 19 which straddle the blade body and engage in longitudinal grooves or recesses 20 located in the opposite sides thereof between the back of the blade and the shoulders 17. The claws may therefore yield into the rubber in an upward direction as well as downwardly, sufficient clearance being provided between the presser feet and the fingers 16 to enable such relative motion as the blade unit rocks back and forth during its oscillatory movement. By reason of their resilient mount, the presser feet will adjust themselves automatically between the fingers to provide the necessary clearance for freedom of action, the feet centering themselves as the elastic body yields between the fingers first upwardly and then downwardly during the lateral rocking of the blade unit on its wiping edge. The fingers serve to restrict the extent of lateral rocking by reason of the adjacency of application and thereby function yieldably to determine the normal angle of drag for the wiping edge over and above that provided by the hinge portion 21. The fingers transmit the arm-applied pressure to the backing as received through the rubber.

The parts of the blade unit are readily assembled by telescopically threading the blade element into the channel form of the holder element and then turning down the end stops 22 thereon to obstruct longitudinal displacement. For this purpose the adjacent fingers 16' may be heavier to enable the bending of the stops without distorting the holder. During the placement of the blade element within its holder, the presser feet may be engaged in their recesses 20 between the proper fingers so that when the stops are operatively placed they not only receive the elements of the blade unit together but they also attach the blade unit to the pressure-distributing unit or superstructure.

The wiper is quiet in operation in that the connection between the two units is through the elastic body of the blade and is yieldably restrained solely by its elasticity between the fingers. The flexible backing is supported in elastic suspension by the rockers with the fingers acting to transmit the arm-applied pressure to the wiping edge through a progressively elastic resistance.

The foregoing description has been given in detail for clarity and without thought of limitation since the inventive principles involved are capable of assuming other physical embodiments without departing from the spirit of the invention and the scope of the appended claims.

What is claimed is:

1. A windshield wiper comprising a blade-element having a wiping edge along one longitudinal margin and having side shoulders, a flexible backing element seating on the opposite margin of and having blade-straddling fingers engaging beneath the side shoulders on the blade-element to unite the two elements into a surface-conforming unit, and pressure distributing bridge means having presser feet seating upon the blade-element and straddling the unit between the fingers at longitudinally spaced intervals, with said feet finding yieldable support in the sides of the blade-element between its back and its side shoulders to enable relative lateral rocking of the unit while applying pressure through the sides of the blade-element to the straddling fingers.

2. A curved-windshield wiper comprising an elongate flexible body having a wiping edge along one longitudinal margin and a flexible non-extensible backing therefor for constraining the wiping edge to follow a surface contour, the sides of the body having recess means and underlying shoulders, and a pressure-applying member extending lengthwise of the body and having terminal parts straddling the body at longitudinally spaced points and engaging the body in the side recess means to support the body and its backing as a unit for lateral rocking, said backing having pressure transmitting members engaged with the shoulders.

3. A curved-windshield wiper comprising an elongate flexible body having a wiping edge along one longitudinal margin and a flexible non-extensible backing therefor for constraining the wiping edge to follow a surface contour, the opposite sides of the body having longitudinally extending grooves opening through an end thereof and also having side shoulders underlying the grooves, said backing having fingers straddling the body and slidably engaged with the shoulders, and a pressure-applying member arranged above the backing and having body-straddling feet slidably engaged in the grooves free of the fingers.

4. A curved-windshield wiper comprising an elongate flexible body having a wiping edge along one longitudinal margin and a flexible non-extensible backing therefor for constraining the wiping edge to follow a surface contour, the opposite sides of the body having longitudinally extending grooves opening through an end thereof and also having side shoulders underlying the grooves, said backing having fingers straddling the body and slidably engaged with the shoulders, and a pressure-applying member arranged above the backing and having body-straddling feet slidably engaged in the grooves free of the fingers, with stop means interlocking the body against lengthwise displacement from the backing and said member.

References Cited in the file of this patent

UNITED STATES PATENTS

| 2,589,339 | Carson | Mar. 18, 1952 |
| 2,596,063 | Anderson | May 6, 1952 |
| 2,634,446 | Mackie et al. | Apr. 14, 1953 |

FOREIGN PATENTS

| 619,320 | Great Britain | of 1949 |
| 957,805 | France | of 1949 |
| 958,708 | France | of 1949 |